Patented May 12, 1925.

1,537,454

UNITED STATES PATENT OFFICE.

FRANK P. BROCK, OF EVANSTON, ILLINOIS, ASSIGNOR TO BAKELITE CORPORATION, OF NEW YORK, N. Y., A CORPORATION OF DELAWARE.

ABRASIVE IMPLEMENT AND METHOD OF MAKING SAME.

No Drawing.   Application filed December 11, 1922. Serial No. 606,298.

*To all whom it may concern:*

Be it known that I, FRANK P. BROCK, a citizen of the United States, residing at Evanston, in the county of Cook and State of Illinois, have invented certain new and useful Improvements in Abrasive Implements and Methods of Making Same, of which the following is a specification.

This invention relates to the manufacture of abrasive, grinding or polishing implements of the type comprising abrasive grains, such as carborundum, emery, crystalline aluminous grains prepared in the electric furnace, and the like, in conjunction with an infusible resinous binder of the phenolic condensation product type. My invention is applicable to the most diverse forms of implements for grinding, polishing and analogous purposes, but will be described by way of example as applied to the manufacture of grinding wheels.

Grinding wheels comprising an abrasive grain and an infusible binder of the phenolic condensation product type have been made heretofore in accordance with U. S. Patent No. 942,808 by mixing the abrasive grains with phenol and formaldehyde, or with the partial reaction products thereof, molding the resulting mass into the desired form, and hardening the binder by sufficient application of heat or of heat in conjunction with pressure. The implements thus prepared possess excellent temperature-resisting qualities, and are unaffected by oils and most chemical reagents; but they are necessarily relatively costly by reason of the time, as well as the nature of the equipment, which is required for their production.

According to the present invention the procedure for making such abrasive or polishing implements is greatly shortened, simplified and cheapened; and at the same time the products exhibit superior qualities attributable to the specific character of the bond and the intimate nature of the union between the bond and the grain.

Following is an illustrative example of the manufacture of a grinding wheel in accordance with my invention, it being understood that the invention is not restricted to the particular manipulations, materials or proportions therein referred to; and also that abrasive or polishing implements of any form or type may be made by essentially similar methods, and according to the invention.

The properly sized abrasive grain, for example carborundum, is first thoroughly mixed with about ten percent by weight of a potentially reactive phenolic resin, preferably in powder form. This latter may comprise either the reactive resin resulting from the initial reaction of a phenol upon formaldehyde or other body containing mobile methylene groups, or the equivalent mixture of a permanently fusible phenolic resin with a sufficient proportion of a hardening agent such as hexamethylenetetramine; and both of these are designated herein as "potentially reactive phenolic resins", meaning thereby a resin which contains the necessary proportion of methylene component to harden it under sufficient application of heat. If desired, a few drops of phenol, cresol, creosote oil or even of water may be introduced in order to prevent segregation in the mass undergoing mixing due to the development of static charges upon the particles. After thorough mixing of the abrasive grain and the powdered resin, I add a relatively small proportion, say three to four percent by weight, of a substance serving the triple function of a solvent for the resin, a plasticizer for the mass, and a supplemental hardener in the final curing step. As such substance I may use any aldehyde body or derivative which is reactive in this relation and has a sufficiently high boiling point, say substantially above 100° C. Benzaldehyde responds to these several requirements, as do many other high-boiling aldehydic bodies, but I now prefer to employ furfural. The furfural is added and the mixing continued until the mass acquires a uniform sticky or tacky consistence. The mass is then removed from the mixer and charged into a mold of appropriate form, in which it is subjected for a brief period, varying from a few seconds to two or three minutes, to heavy pressure. The degree of pressure will depend somewhat upon the size and character of the grain, but pressures of 500 to 1000 lbs. per square inch will ordinarily suffice. This may be a cold-molding operation, since excellent results are attained without any application of heat at this stage, although the use of heated molds is not excluded. The formed article is then removed from the mold and placed in an oven, in which it is baked at a temperature of about 150°–200° C. for one to five hours, more or less, depending upon the dimensions of the article, the baking being continued until the resin is transformed to its ultimate infusible state. It is preferable to permit the wheels to cool slowly after this baking, as they are thereby rendered tougher.

Primary advantages of this procedure are its rapidity and the relatively low equipment cost. Under the prior practice it was necessary to maintain the mixture under pressure in heated molds for considerable periods, say five to thirty minutes according to the size of the wheel or other implement. By the present method, on the other hand, heated molds are not required, and any wheel or implement, irrespective of size, may be molded in preparation for baking, in two to three minutes or even less. Furthermore it is possible to produce by this method a stronger and tougher wheel, owing to the ultimate reactivity of the high-boiling aldehyde.

Among the aldehyde bodies which may be substituted wholly or in part for furfural in the practice of this invention I may mention such substances as benzaldehyde, hexoic aldehyde, isohexyl aldehyde, mannoheptose, methylfurfural, nitro-benzaldehyde, phenyl-acetaldehyde, tetrahydro-benzaldehyde, and many others of analogous character. In general, any body of aldehyde type or derivation which is reactive toward phenol and the phenolic resins, and possesses solvent properties for such resins, and a relatively high boiling point, will serve the purposes of this invention.

I claim:

1. In the manufacture of abrasive or polishing implements, the method comprising incorporating a potentially reactive phenolic resin, and a reactive aldehyde having a boiling point substantially above 100° C., with an abrasive material; molding the resulting mixture under pressure; and heating the shaped article to transform the resinous binder.

2. In the manufacture of abrasive or polishing implements, the method comprising incorporating a potentially reactive phenolic resin in powder form with abrasive grains; plasticizing the mass by the addition of a reactive aldehyde having a boiling point substantially above 100° C.; molding the resulting mixture under pressure; and heating the shaped article to transform the resinous binder.

3. Method according to claim 1 in which furfural is employed as the reactive aldehyde.

4. Method according to claim 2 in which furfural is employed as the plasticizing aldehyde.

5. In the manufacture of abrasive implements and the like, the steps comprising commingling abrasive grains with a potentially reactive phenolic resin and a plasticizing agent therefor; cold-molding the mixture to the desired form; and transforming the resinous binder by a subsequent heating operation.

6. In the manufacture of abrasive implements the steps comprising commingling abrasive grains with a potentially reactive phenolic resin and a reactive aldehyde plasticizing agent; cold-molding the mixture to the desired form; and transforming the resinous binder by a subsequent heating operation.

7. Method according to claim 5 in which furfural is employed as the plasticizing agent.

8. An abrasive or polishing implement comprising abrasive grains and a binder therefor, said binder comprising the infusible product of reaction of a potentially reactive phenolic resin and a reactive aldehyde having a boiling point substantially above 100° C.

9. An abrasive or polishing implement comprising abrasive grains and a binder therefor, said binder comprising the infusible product of reaction of a potentially reactive phenolic resin and furfural.

In testimony whereof, I affix my signature.

FRANK P. BROCK.